United States Patent [19]
Bradley

[11] Patent Number: 4,988,083
[45] Date of Patent: Jan. 29, 1991

[54] BUMPER FOR A CORNER
[75] Inventor: Warren L. Bradley, Street, Md.
[73] Assignee: Westinghouse Electric Corp., Pittsburgh, Pa.
[21] Appl. No.: 402,728
[22] Filed: Sep. 5, 1989
[51] Int. Cl.[5] .............................................. F16F 1/52
[52] U.S. Cl. .................................... 267/140; 114/219; 405/215
[58] Field of Search ............... 114/219; 267/136, 139, 267/140, 141, 153; 293/136; 405/215

[56] References Cited
U.S. PATENT DOCUMENTS

| | | | |
|---|---|---|---|
| 1,981,182 | 11/1934 | Lyons | 267/140 X |
| 2,307,255 | 1/1943 | Bell | 267/140 X |
| 3,072,393 | 1/1963 | Hawkins | 267/153 |
| 3,922,408 | 11/1975 | Smith | 267/140 X |

FOREIGN PATENT DOCUMENTS
0009932 1/1980 Japan .................................. 405/215

Primary Examiner—Duane A. Reger
Attorney, Agent, or Firm—J. K. Willamson

[57] ABSTRACT

A bumper for a transportable object mitigates the shock on a corner of the object during a collision. The bumper has intersecting wall sections which are mounted on a corner of the transportable object, deflectable protrusions between adjacent wall sections and a deflectable protuberance at the apex of the wall sections. The protrusions extend outwardly of the adjacent wall sections and the protuberance extends outwardly of the protrusions. In a collision, the protuberance and the protrusions deflect to decelerate the object.

16 Claims, 5 Drawing Sheets

BUMPER FOR A CORNER

BACKGROUND OF THE INVENTION

This invention generally relates to a bumper for mitigating the shock on a corner of a transportable object during a collision and to a transportable object, such as, e.g., a transit case, having shock mitigating bumpers on at least some of its corners.

A transportable object having corners, such as a transit case, may fall or be thrust against a floor or another object when, for example, a vehicle transporting the case suddenly changes direction or speed. If the case is not sufficiently decelerated during the collision, the case and/or its contents may be damaged or even destroyed when the case finally comes to rest.

Compressible rubber blocks heretofore have been attached to the corners of transit cases, but these blocks frequently cannot effectively absorb the loadings over a broad range of collision forces to protect such cases or commonly transported objects such as printed circuit boards. If the rubber corner blocks are too rigid, then the corner blocks may not provide a cushion. If, on the other hand, the rubber corner blocks are too compressible, then the corner of the case may bottom violently against another object upon a hard impact.

Thus it is an object of the present invention to provide a bumper for declerating a transportable object such as, for example, a transit case, a crate or other frame for protecting transportable articles to mitigate the shock upon the object during a collision. It is a particular object to provide a bumper adapted to protect a transportable object during collisions of a corner, or an edge or a side adjacent to the bumpered corner.

SUMMARY OF THE INVENTION

With these objects in view, the present invention resides in a shock mitigating bumper which decelerates a transportable object such as a transport case or the like during a collision by deflecting and then (in the case of particularly violent collisions) elastically compressing certain parts of the bumper.

A bumper embodying the present invention has adjacent wall sections adapted to be mounted upon a corner of a transportable object with the wall sections of the bumper generally defining an apex. Deflectable protrusions are disposed between adjacent wall sections and extend outwardly of the wall sections. A deflectable protuberance is disposed at the apex and extends outwardly of the protrusions. Preferably the protrusions and the protuberance are also elastically compressible. Thus, when one or more corners or an edge or a surface adjacent the bumpered corners collides with another object, the protuberances deflect and the protrusions deflect and then, in the case of violent collisions, the protuberance and the protrusions elastically compress to controllably decelerate the bumpered object in stages.

In a preferred embodiment of the present invention, there are protrusion cavities and a protuberance cavity which communicate with the surrounding atmosphere. In standard tests, transit cases having bumpered corners have been dropped on their corners, edges and sides onto concrete-supported plywood without damage to the cases or to printed circuit boards contained in them. In contrast thereto, virtually identical cases without bumpered corners have been dropped under the same general test conditions and the cases were severely damaged. Also the printed circuit boards in the cases without bumpered corners had broken soldered leads and bent connector ends.

The present invention also resides in transportable objects such as transit cases, and in objects such as printed circuit boards or the like having such bumpered corners for mitigating the shock on a corner of the object during a collision.

DESCRIPTIONS OF THE DRAWINGS

The invention will become more readily apparent from the following description of a preferred embodiment thereof shown, by way of example only, in the accompanying drawings, wherein.

DESCRIPTION OF THE PREFERRED EMBODIMENT

Figure 6:
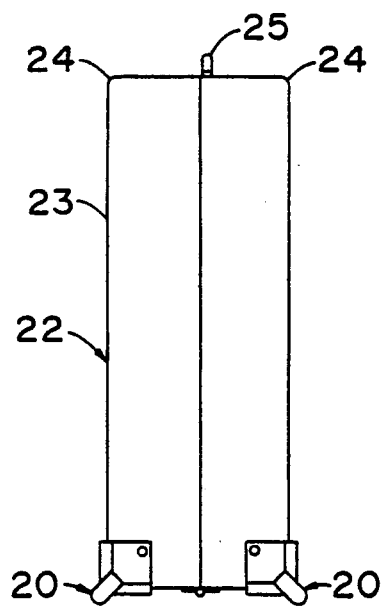
FIG. 6 is an end view of a transportable case having shock mitigating bumpers at its bottom corners.

FIGS. 1 to 5 generally show a shock mitigating bumper 20 for protecting a transportable object such as the generally rectangular transit case 22 having sides 23, corners 24 and handle 25 as shown in FIG. 6 from collision forces which may damage the case or its contents if the transit case 22 were dropped. The transit case 22 may have bumpers 20 on only the bottom corners (which are not seen in FIG. 6) or, preferably, on all corners 24 including the upper corners. The present invention is useful with any transportable object whether designed to be transported by hand or by mechanical devices.

Referring to FIGS. 1 to 5, a bumper 20 has adjacent wall sections 26 which are adapted to be mounted upon a corner 24 of the generally rectangular transit case 22 shown in FIG. 6. Thus there are three intersecting wall sections 26 which have mounting holes 28 for accepting rivets, screws or like fasteners (not shown) to mechanically mount the bumper 20 on a corner 24. Alternatively, the bumper 20 may be adhesively bonded to the transit case 22 or integrally molded with the transit case 22. The wall sections 26 generally define an apex 30 at the intersection of their planes. The wall sections 26 need not be perpendicular but may be configured to fit over any shape, such as a rounded corner 24 of commercially available molded luggage. On the other hand, the corners of boxes and crates would likely be well defined and the bumpers would have generally perpendicular wall sections. As will be described below, the wall sections 26 preferably do not actually intersect at the apex 30.

The wall sections 26 may also have end membranes 32 for generally sealing the ends of wall sections 26 against the transit case to inhibit airborne contaminates and moisture from accumulating in the space between the bumper 20 and the corner 24. The end membranes 32 also provide a more attractive appearance. Preferably, the membranes 32 do not form an airtight seal with the transit case 22 or other transportable object but permit air to leak past the membranes 32 to dissipate a portion of the shock during a collision and later when the bumper 20 regains its shape. In embodiments of the invention comprising an assembly of two or more separate parts, the membranes 32 may also retain the other parts in place.

Deflectable protrusions 34 such as the cylinders shown are disposed between adjacent wall sections 26 and, as shown, extend outwardly of the adjacent wall sections 26. The protrusions 34 have cavities 36 which are preferably opposite a portion of the adjacent wall sections 26.

A deflectable protuberance 40 such as the ball shown is disposed at the apex 30 of the bumper 20 and extends outwardly of the protrusions 34. The protuberance 40 has a cavity 42 which preferably extends opposite a portion of the adjacent wall sections 26. Also, the protuberance cavity 42 preferably extends outwardly of the protrusion cavities 36.

Figure 1:
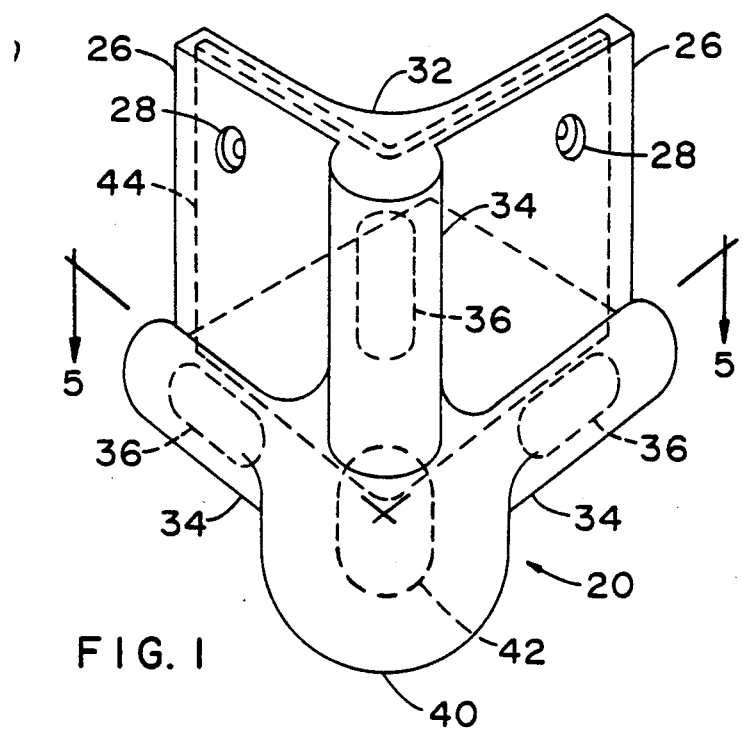
FIG. 1 is a perspective view of the exterior part of a shock mitigating bumper embodying the present invention.
Figure 2:
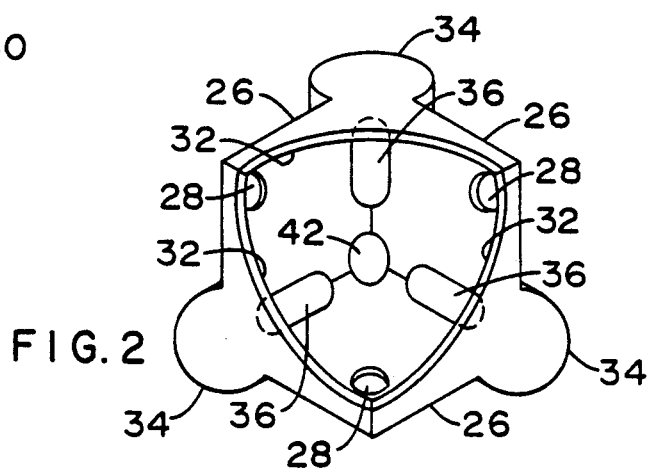
FIG. 2 is a perspective view of the interior part of the shock mitigating bumper of FIG. 1.
Figure 3:
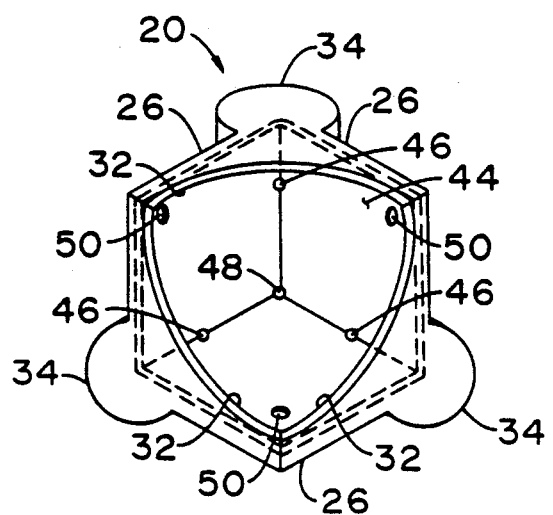
FIG. 3 is a perspective view of the interior part of the shock mitigating bumper shown in FIG. 2 with an interior liner.
Figure 4:
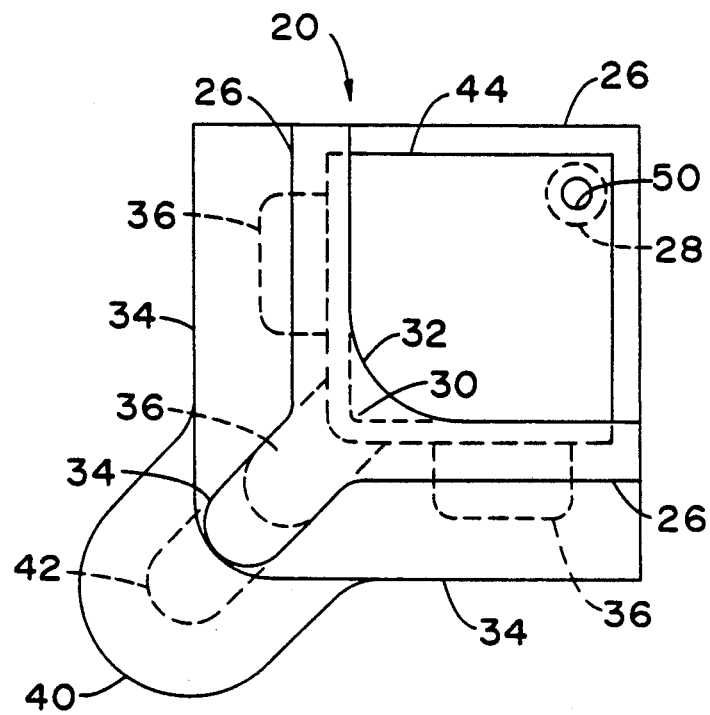
FIG. 4 is a plan view of the shock mitigating bumper of FIG. 1.
Figure 5:
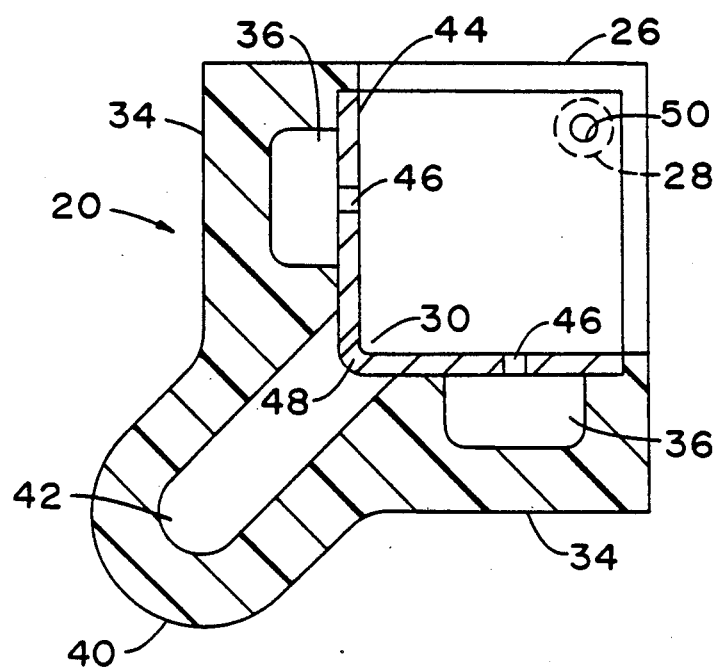
FIG. 5 is a plan sectional view of the shock mitigating bumper of FIG. 1 taken along section line 5—5.

The protrusion cavities 36 and the protuberance cavity 42 preferably communicate with the general atmosphere around the transit case 22. If the bumper 20 shown in FIG. 2, showing cavities 36, 42 which are open to the interior of the bumper 20, are mounted directly on a corner 24 of a case 22, the cavities 36, 42 communicate with the general atmosphere via the space between the bumper wall sections 26 (and membranes 32) and the sides of the transit case 22. If, as is preferred, a liner 44 is employed between the bumper 20 and the transit case 22, the liner is provided with protrusion orifices 46 for communication of the protrusion cavities 36 with the spaces between the wall sections 26 and the transit case 22. Similarly, a protuberance orifice 48 at apex 30 provides for communication between the protuberance cavity 42 and the spaces between the bumper 20 and the transit case 22. The liner 44 may have a more rounded apex than is shown in the drawings. However the apex of the liner preferably has a radius which is smaller than the radius of the corner of the transportable object so that the liner can deform or be crushed. In addition, the liner 44 preferably is a rigid material such as a metal which can be integrally molded with the bumper 20 or bonded thereto. Thus, the bumper 20 may be a urethane or other suitable elastomer. The liner 44 has mounting holes 50 which are aligned with the bumper mounting holes 28 for receiving fasteners (not shown) when the bumper 20 is to be fastened to the transit case. A liner 44 is advantageously used to adapt a bumper 20 to any corner configuration and to provide a base against which the bumper protrusions 34 and the protuberance 40 may deflect and then elastically compress.

In a series of standard tests, 28 liter (one cubic foot) 18 kilogram (forty-pound) transit cases containing printed circuit boards and having corner bumpers 20 were dropped about 1.3 meters (four feet) onto a plywood board supported by concrete. The bumpers 20 were relatively small, the liner 44 having 50 mm by 50 mm sides. In one series of tests, the bumpers 20 comprised a urethane elastomer having a Shore durometer hardness of 60. In a second series of tests, a urethane elastomer having a Shore durometer hardness of 40 was employed. As a control, a transit case without bumpers was dropped under the same conditions. In these tests, it was found that the transit case having unprotected corners was badly damaged and the printed circuit board it contained had broken leads and bent connectors and was not therefore operable. The transit cases having bumpered corners and the printed circuit boards they contained experienced little damage in the 40 durometer test and practically no damage in the 60 durometer test.

It was also determined that, at least in this test, the 60 durometer elastomer bumper better protected the transit case and its contents than did the 40 durometer elastomer bumper. The tests indicated that the 40 durometer bumper did not absorb enough energy before it completed its decelerating function and that the case was damaged when it bottomed on its corner during the collision. The 60 durometer bumper absorbed relatively more energy while it deflected and compressed so that practically no damage was sustained when the transit case finally came to rest.

Figure 7A:
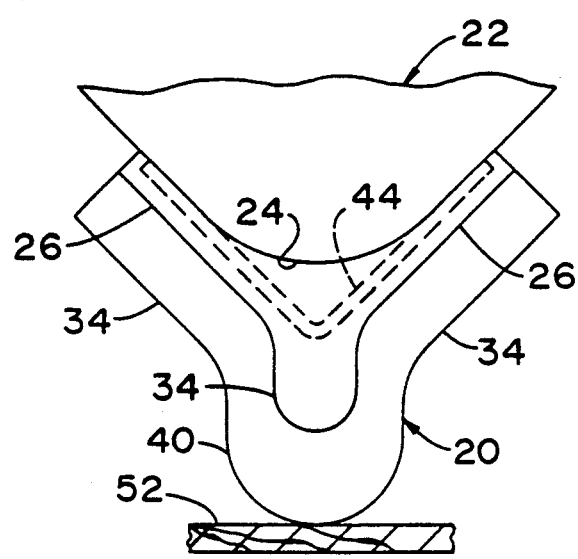
FIGS. 7 (*a-c*) are a progressive schematic representation of a corner drop of a transportable case upon a shock mitigating bumper shown in FIGS. 1 to 5.
Figure 7B:
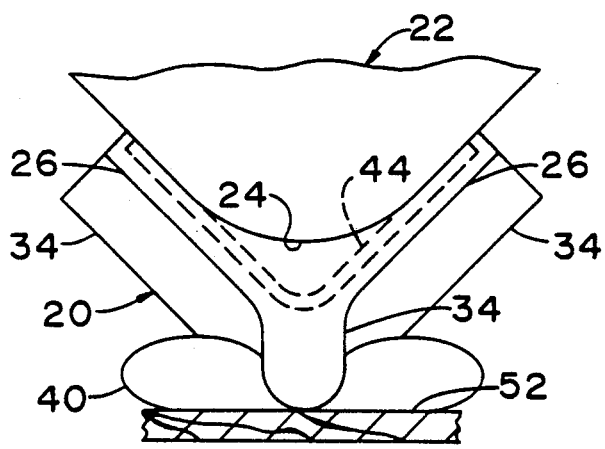
Figure 7C:
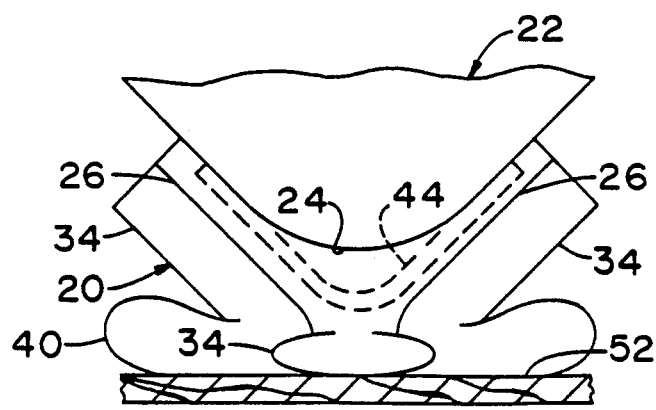
Figure 8A:
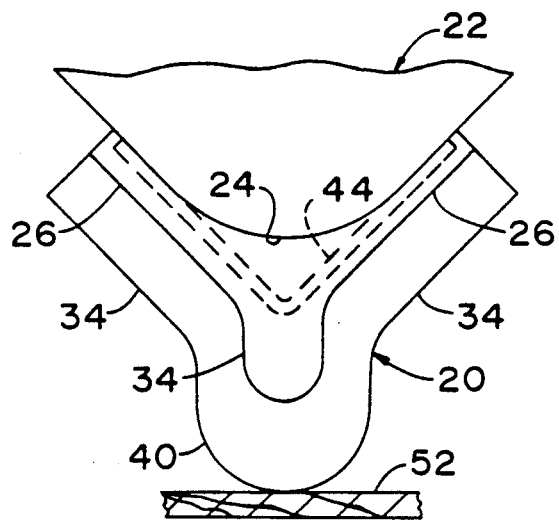
FIGS. 8 (*a-d*) are a progressive schematic representation of an edge drop of a transportable case upon shock mitigating bumpers shown in FIGS. 1 to 5.
Figure 8B:
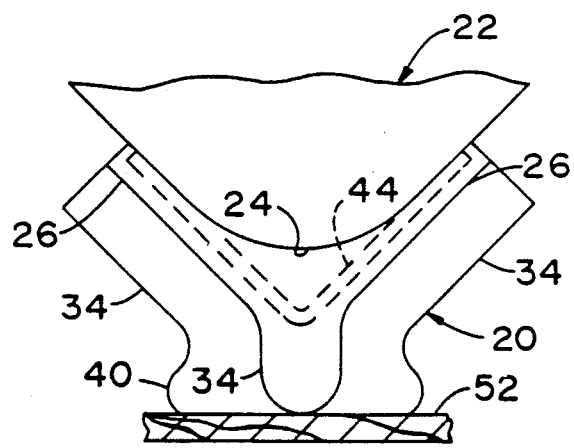
Figure 8C:
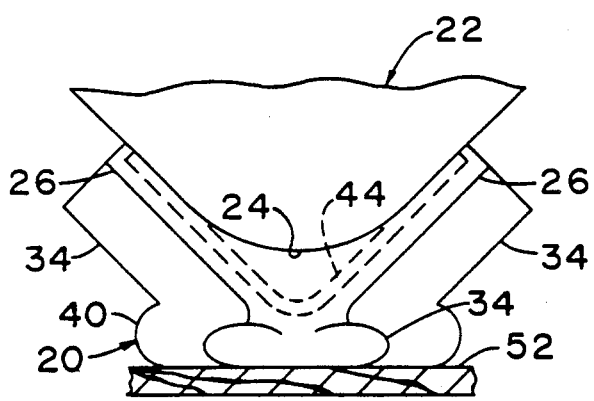
Figure 8D:
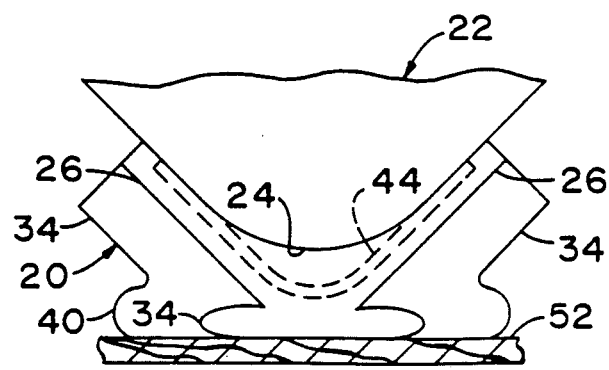
Figure 9A:
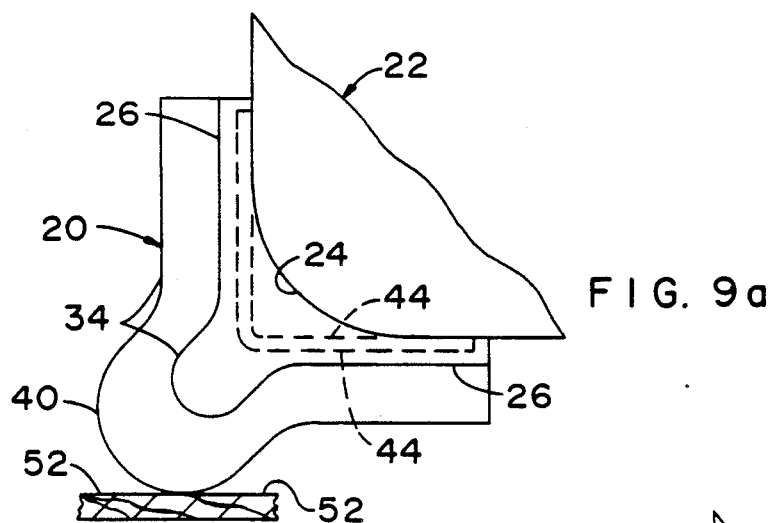
FIGS. 9 (*a-c*) are a progressive schematic representation of a side drop of a transportable case upon shock mitigating bumpers shown in FIGS. 1 to 5.
Figure 9B:
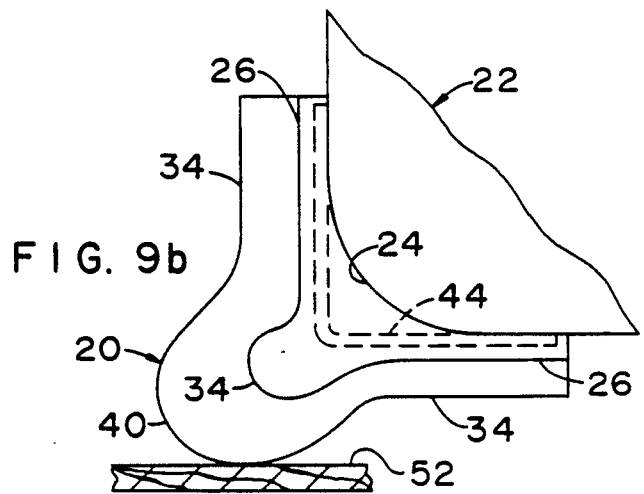
Figure 9C:
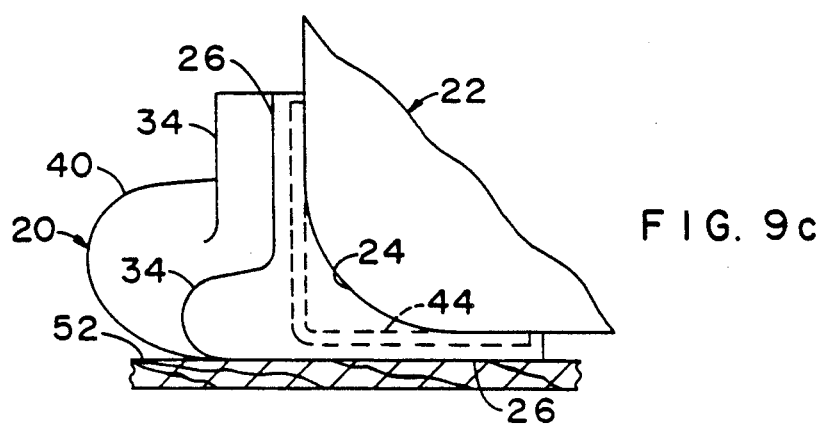

FIGS. 7 to 9 generally show the nature of the deformation of the bumper 20 of FIGS. 1 to 5 which can occur in a corner drop, an edge drop and a side drop, onto a plywood or similar surface 52. FIGS. 7(a), 8(a) and 9(a) show the initial condition of the bumper 20 when it first touches the surface 52. In a corner drop, the protuberance 40 bulges (FIG. 7b) and then the protrusion 34 bulges (FIG. 7c). In an edge drop, the protuberances 40 tend to rotate (FIG. 8b), then the intermediate protrusions 34 collapse (FIG. 8c) and finally the protuberance 40 and protrusions 34 are compressed by the liner 44 (FIG. 8d). In a side drop, four protuberances 40 tend to rotate (FIG. 9c), and finally the protuberances 40 and the protrusions 34 are compressed by the liner 44. As FIGS. 7(c) and 8(c) show, the liner 44 may also deform in some situations.

While a presently preferred embodiment of the present invention has been shown and described, it is to be distinctly understood that the invention is not limited thereto but may be otherwise variously embodied within the scope of the following claims.

What is claimed is:

1. A bumper for mitigating the shock on a corner of a transportable object during a collision, comprising:
    adjacent wall sections adapted to be mounted upon a corner of a transportable object, the wall sections generally defining an apex;
    deflectable protrusions disposed between and extending outwardly of the adjacent wall sections, wherein said protrusions have cavities; and
    a deflectable protuberance disposed at the apex extending outwardly of the protrusions.

2. The bumper of claim 1, wherein each protrusion cavity extends opposite two adjacent wall sections.

3. The bumper of claim 2, wherein the protrusion cavities have openings in communication with the surrounding atmosphere.

4. A bumper for mitigating the shock on a corner of a transportable object during a collision, comprising:

adjacent wall sections adapted to be mounted upon a corner of a transportable object, the wall sections generally defining an apex;

deflectable protrusions disposed between and extending outwardly of the adjacent wall sections; and a deflectable protuberance disposed at the apex extending outwardly of the protrusions, wherein said protuberance has a cavity.

5. The bumper of claim 4, wherein the protuberance extends opposite the wall sections adjacent the apex.

6. The bumper of claim 4, wherein the protuberance cavity extends outwardly of the protrusion cavities.

7. The bumper of claim 4, wherein the protuberance cavity has an opening in communication with the surrounding atmosphere.

8. A bumper for mitigating the shock on a corner of a case having corners defined by intersecting sides during a collision, comprising:

three intersecting wall sections adapted to be mounted the sides of the case with the intersection of the wall sections generally defining an apex, deflectable protrusions outwardly extending from the intersections of adjacent wall sections and a deflectable protuberance extending from the apex outwardly of the protrusions.

9. The bumper of claim 8, wherein the deflectable protrusions and the deflectable protuberance have 10. The bumper of claim 8, wherein the deflectable protrusions and deflectable protuberance have cavities which communicate with the atmosphere around the case.

11. The bumper of claim 10, wherein the deflectable protrusions and deflectable protuberance are elastically compressible.

12. The bumper of claim 10, wherein the cavities are closed by a liner having orifices which communicate with the atmosphere around the case.

13. The bumper of claim 12, wherein the liner is rigidly adapted to fit between the wall sections and the case.

14. A transportable object having corners with bumpers for mitigating the shock on the corners of the case during a collision, the bumpers comprising:

intersecting wall sections generally defining an apex;

deflectable protrusions disposed between and extending outwardly of the adjacent wall sections, wherein said protrusions have cavities; and a deflectable protuberance disposed at the apex, extending outwardly of the protrusions, wherein said protuberance has a cavity.

15. The transportable object of claim 14, wherein the deflectable protrusion cavities and the deflectable protuberance cavity communicate with the atmosphere around the object.

16. The transportable object of claim 15, wherein the deflectable protrusions and the deflectable protuberance are elastically compressible.

* * * * *